(12) United States Patent
Hisatomi (10) Patent No.: US 7,266,829 B2
(45) Date of Patent: Sep. 4, 2007

(54) OPTICAL HEAD APPARATUS, OPTICAL HEAD TRANSFERRING METHOD AND OPTICAL DISK APPARATUS

(75) Inventor: Susumu Hisatomi, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 749 days.

(21) Appl. No.: 10/812,186

(22) Filed: Mar. 30, 2004

(65) Prior Publication Data

US 2004/0244018 A1 Dec. 2, 2004

(30) Foreign Application Priority Data

May 29, 2003 (JP) ............................. 2003-153078

(51) Int. Cl.
*G11B 17/04* (2006.01)
(52) U.S. Cl. .................................... 720/644
(58) Field of Classification Search ............... 720/644, 720/603, 665; 369/219.1, 244.1, 215.1, 249.1
See application file for complete search history.

(56) References Cited

U.S. PATENT DOCUMENTS 5,796,702 A * 8/1998 Bessho ................. 369/112.24
6,918,129 B2 * 7/2005 Sudou ........................ 720/664
7,024,673 B2 * 4/2006 Dupper et al. .............. 720/664

FOREIGN PATENT DOCUMENTS

| JP | 7-93920 | 4/1995 |
| JP | 7-122004 | 5/1995 |
| JP | 7-147018 | 6/1995 |
| JP | 11-353824 | 12/1999 |
| JP | 2002-216442 | 8/2002 |

* cited by examiner

*Primary Examiner*—Allen Cao
(74) *Attorney, Agent, or Firm*—Pillsbury Winthrop Shaw Pittman, LLP (57) ABSTRACT

An optical head apparatus comprises a head unit for irradiating an optical disk with a light beam for recording or reproducing data, a holder for fixing the head unit thereto, a support unit for movably supporting the holder in a radial direction of the optical disk, a support member fixed to the holder, a rack unit movably engageable with the support member within a predetermined range and having a rack along a moving direction of the holder, a gear meshing with the rack of the rack unit, so as to transmit rotating force of a drive source to the rack, and an urging unit for urging the rack unit against the support member in such a manner that the rack meshes with the gear by a predetermined resilient force.

15 Claims, 10 Drawing Sheets

OPTICAL HEAD APPARATUS, OPTICAL HEAD TRANSFERRING METHOD AND OPTICAL DISK APPARATUS

CROSS-REFERENCE TO RELATED APPLICATIONS

This application is based upon and claims the benefit of priority from prior Japanese Patent Application No. 2003-153078, filed May 29, 2003, the entire contents of which are incorporated herein by reference.

BACKGROUND OF THE INVENTION

1. Field of the Invention

The present invention relates to an optical head apparatus which records or reproduces data with respect to an optical disk and an optical head transferring method. Furthermore, the present invention relates to an optical disk apparatus which uses the above-described optical head apparatus.

2. Description of the Related Art

As is well known, there has been widely prevailed so-called multi disk drive equipment which not only can record and reproduce data with respect to a CD (i.e., a compact disk) but also can record and reproduce data with respect to an optical disk such as a DVD (i.e., a digital versatile disk).

The multi disk drive equipment of this type is used in equipment incorporated in a note book type personal computer or the like in addition to use as external equipment for a desk top type personal computer or the like, and therefore, its outside dimension is reduced in size and thickness as possible.

There is provided a feed mechanism in a general optical disk apparatus since an optical head for recording and reproducing data with respect to the optical disk must be moved in the radial direction of the optical disk. Such a feed mechanism is configured in such a manner as to convert the rotating force of a motor into a linear motion by means of a gear and a rack so as to transmit the force to the optical head.

Consequently, a play, that is, a backlash generated when the gear and the rack mesh with each other induces a drawback from the viewpoint of the accuracy of the transfer of the optical head. As a result, suppression of such a backlash without degrading miniaturization has been an important problem to enhance the accuracy of the transfer of the optical head.

Jpn. Pat. Appln. KOKAI Publication No. 2002-216442 discloses the configuration in which two racks are superimposed one on another to urge each other oppositely in a longitudinal direction by resilient force, so as to achieve favorable meshing with a pinion gear. Moreover, Jpn. Pat. Appln. KOKAI Publication No. 11-353824 discloses the configuration in which a pinion is pressed against a rack via a spring.

However, in the former configuration, the two racks need be superimposed one on another, thereby inducing a complicated configuration. In contrast, in the latter configuration, since the rotating pinion is pressed against the rack via the spring, a supporting mechanism for the pinion has a complicated and huge configuration, thereby arising a problem that a size cannot be reduced.

Additionally, Jpn. Pat. Appln. KOKAI Publication No. 7-93920 discloses the configuration in which a feed rack is moved in parallel to a rod, and further, the driving force of a gear is made constant by making a load applied on the gear uniform, thus eliminating a backlash.

In addition, Jpn. Pat. Appln. KOKAI Publication No. 7-122004 discloses the configuration in which an optical pickup can be moved with smaller acceleration so as to enhance track followability by alleviating an influence of slide friction.

Furthermore, Jpn. Pat. Appln. KOKAI Publication No. 7-147018 discloses the configuration in which a rack and a gear are brought into smooth contact with each other by integrally forming a base provided with the rack of a plastic-based material, thus reading information with high accuracy.

However, the techniques disclosed in Jpn. Pat. Appln. KOKAI Publication Nos. 7-93920, 7-122004 and 7-147018 merely have had the complicated configuration and the large size, and therefore, they have not reached a practical and satisfactory level in current circumstances.

BRIEF SUMMARY OF THE INVENTION

According to one aspect of the present invention, there is provided an optical head apparatus comprising: a head unit configured to irradiate an optical disk with a light beam for recording or reproducing data; a holder configured to fix the head unit thereto; a support unit configured to movably support the holder in a radial direction of the optical disk; a support member configured to be fixed to the holder; a rack unit configured to movably engage with the support member within a predetermined range and to have a rack along a moving direction of the holder; a gear configured to mesh with the rack of the rack unit, so as to transmit rotating force of a drive source to the rack; and an urging unit configured to urge the rack unit against the support member in such a manner that the rack meshes with the gear by a predetermined resilient force.

According to one aspect of the present invention, there is provided an optical head transferring method comprising: fixing a head unit which irradiates an optical disk with a light beam for recording or reproducing data, securing a support member to a holder movably supported in a radial direction of the optical disk, allowing a rack unit having a rack along a moving direction of the holder to movably engage with the support member within a predetermined range, and further, urging the rack unit against the support member in such a manner that the rack meshes with a gear by a predetermined resilient force; and rotating and driving the gear, so as to apply driving force to the rack, thus moving the head unit in the radial direction of the optical disk.

According to one aspect of the present invention, there is provided an optical disk apparatus comprising: a tray configured to allow an optical disk to be placed thereon; a loading unit configured to move the tray between a first position, at which the optical disk can be loaded or unloaded, and a second position, at which the optical disk is rotated to be driven; a head unit configured to irradiate the optical disk placed on the tray moved to the second position by the loading unit with a light beam for recording or reproducing data; a holder configured to fix the head unit thereto; a support unit configured to movably support the holder in a radial direction of the optical disk; a support member configured to be fixed to the holder; a rack unit configured to movably engage with the support member within a predetermined range and to have a rack along a moving direction of the holder; a gear configured to mesh with the rack of the rack unit, so as to transmit rotating force of a drive source to the rack; and an urging unit configured to urge the rack unit against the support member in such a manner that the rack meshes with the gear by a predetermined resilient force.

DETAILED DESCRIPTION OF THE INVENTION

Figure 1:
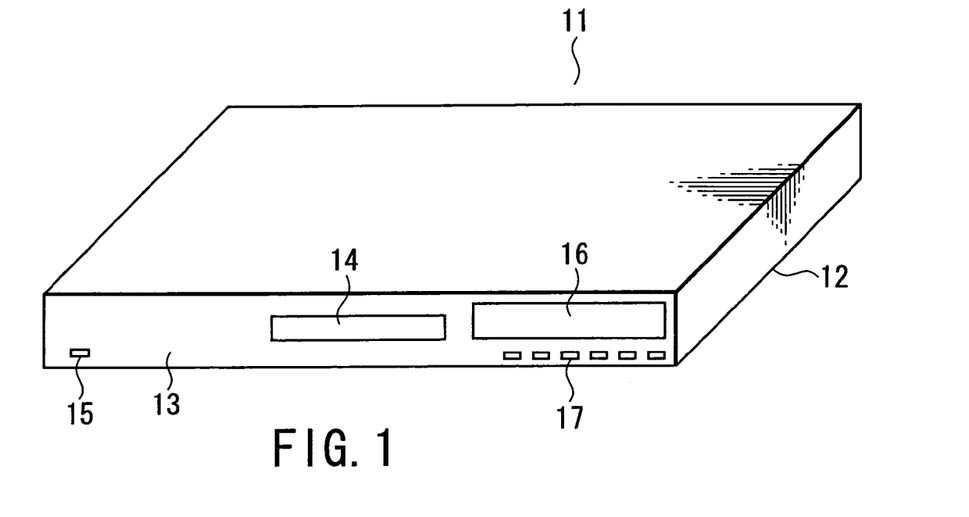
FIG. 1 is an external view illustrating an optical disk apparatus in an embodiment according to the present invention.

An embodiment according to the present invention will be described below in reference to the accompanying drawings. FIG. 1 is an external view of an optical disk apparatus 11 illustrated in this embodiment. That is, the optical disk apparatus 11 is provided with a cabinet 12 formed into a box of a substantially thin type.

At the center of a front panel 13 in the cabinet 12 is disposed a disk loading unit 14, which is adapted to load or unload an optical disk such as a CD or a DVD by putting in or out a tray, described later, outward of the front panel 13 in the cabinet 12.

Furthermore, a power source key 15 is disposed at one end of the front panel 13 in the cabinet 12. Moreover, at the other end of the front panel 13 are provided a display unit 16 for displaying an operating state and a plurality of operating keys 17 for setting the optical disk apparatus 11 in a predetermined operative state or an inoperative state.

Figure 2:
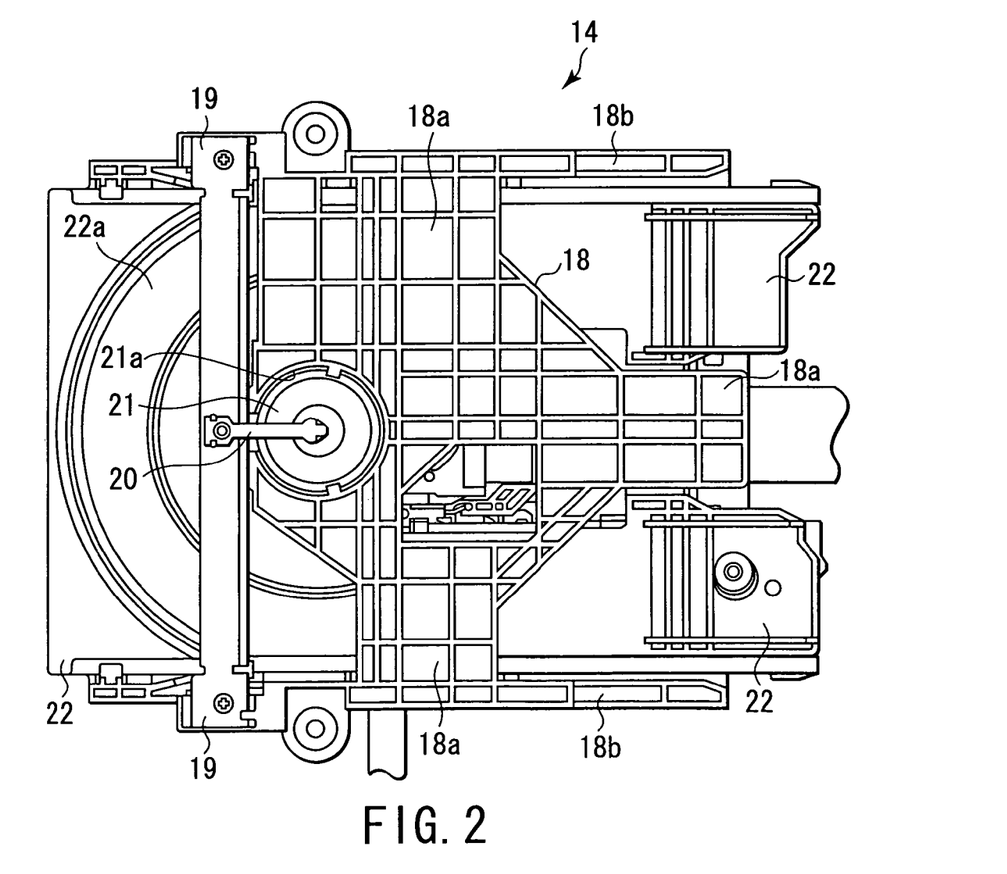
FIG. 2 is a view illustrating the state of a disk loading unit in the optical disk apparatus, viewed from the top.

FIG. 2 illustrates the state in which the disk loading unit 14 is taken out, as viewed from the top. That is, a base member 18 serves as a fixing base for directly or indirectly supporting various component parts.

The base member 18 includes a top plate 18a, side plates 18b and 18b formed at both ends facing to the top plate 18a, a bottom plate 18c, not illustrated in FIG. 2, extending from the side plates 18b and 18b and facing to the top plate 18a, and a front plate 18d, not illustrated in FIG. 2, for connecting the respective fore ends of the side plates 18b and 18b to each other and having a clearance formed thereat, into which a tray 22, described later, is loosely inserted between the top plate 18a and the same.

Among these constituent parts, a connecting plate 19 is disposed across the side plates 18b and 18b. At the center of the connecting plate 19 is fixed a clamp member 21 via a fixing piece 20 having resiliency. The clamp member 21 is urged by the fixing piece 20 inward of the base member 18 via an opening 21a formed at the top plate 18a of the base member 18.

Additionally, the tray 22 is supported by the base member 18. The tray 22 is supported in a freely slidable manner in a lateral direction in FIG. 2 in the state in which a disk placing portion 22a faces to the top plate 18a. In this case, the tray 22 is supported in a freely slidable manner while both side faces thereof are fixed via bosses disposed at the bottom plate 18c of the base member 18.

Figure 3:
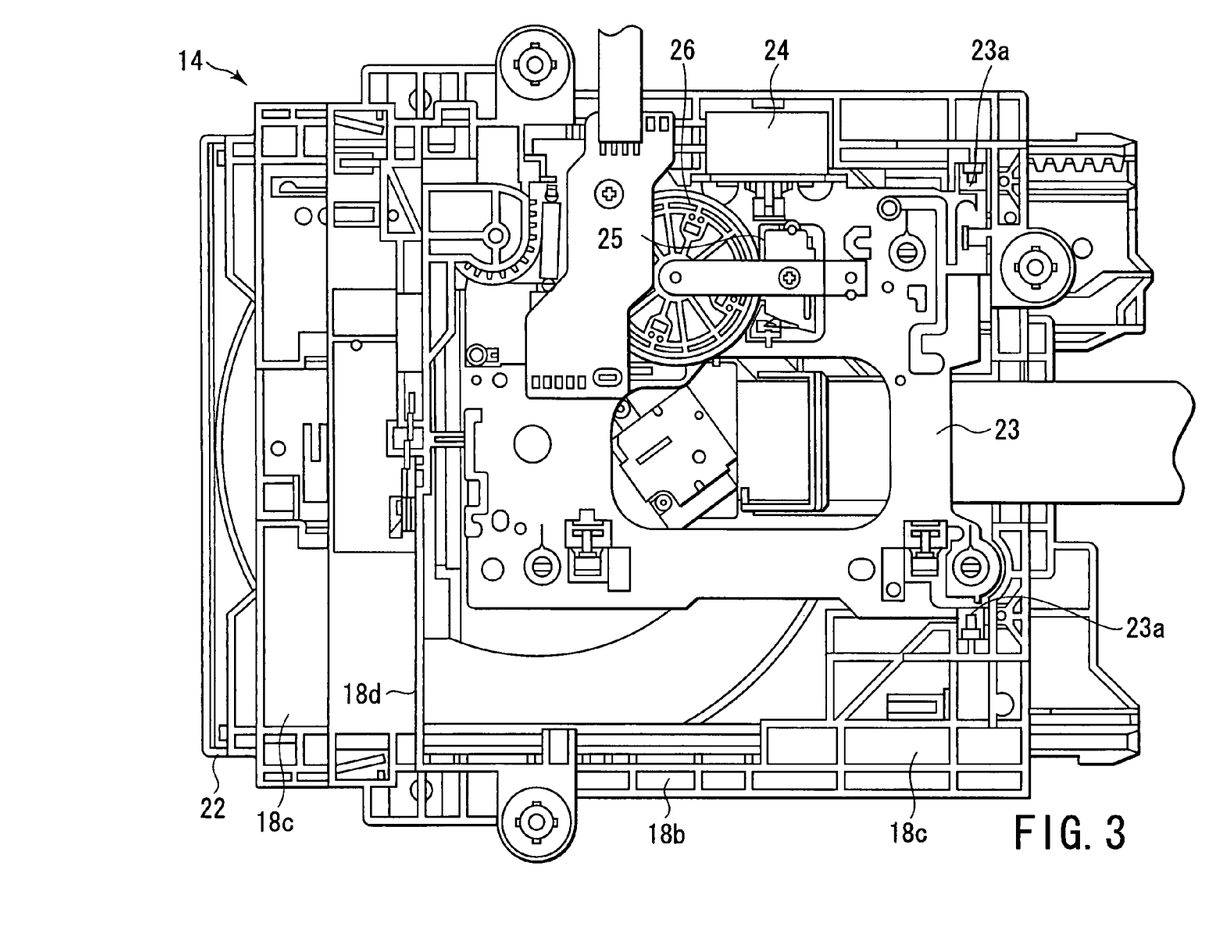
FIG. 3 is a view illustrating the state of the disk loading unit in the optical disk apparatus, as viewed from the bottom.

FIG. 3 illustrates the state in which the disk loading unit 14 is viewed from the bottom. Namely, a chassis 23 is supported by the bottom plate 18c of the base member 18 in such a manner as to face to the bottom of the tray 22. On the chassis 23 are mounted a turn table, an optical head and the like, described later.

In the chassis 23, projections 23a an 23a formed at one end are rotatably supported by the bottom plate 18c. Consequently, the chassis 23 can be supported to be moved in a tilting direction on the projections 23a and 23a as fulcrums at the other end thereof.

By the chassis 23 is supported a drive motor 24. To the rotary shaft of the drive motor 24 is fitted a worm gear 25. The worm gear 25 meshes with a worm wheel 26 rotatably supported by the chassis 23, so that the rotating force of the drive motor 24 is transmitted to the worm wheel 26.

In this manner, the worm wheel 26 is rotated by the rotating force of the drive motor 24, and therefore, the tray 22, the chassis 23, the optical head and the like can be moved.

Figure 4:
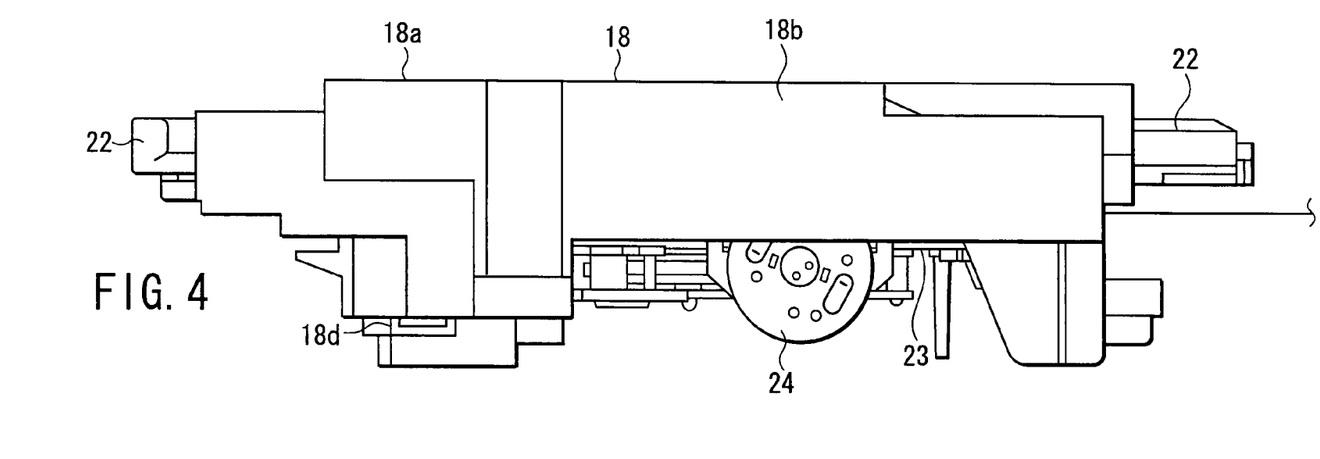
FIG. 4 is a view illustrating the state in which a tray is contained inside of a base member in the disk loading unit.

FIG. 4 illustrates the state of the tray 22 contained inside of the base member 18, as viewed from the side. In this case, the chassis 23 is controlled at a position above the tray 22. At this position, the optical disk is lifted up from the tray 22 by the turn table, so as to be held between the clamp member 21 and the turn table, and further, an optical head faces to a signal recording surface of the optical disk.

Figure 5:
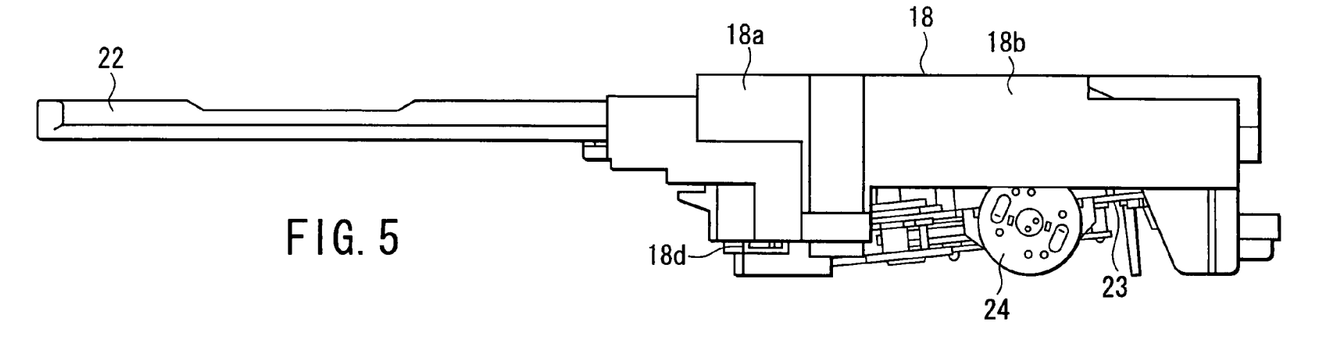
FIG. 5 is a view illustrating the state in which the tray is drawn from the base member in the disk loading unit.

FIG. 5 illustrates the state in which the tray 22 is drawn from the base member 18, as viewed from the side. In this case, the chassis 23 is controlled at a position under the tray 22. At this position, the turn table is separated from the optical disk, which is placed on the tray 22.

Figure 6:
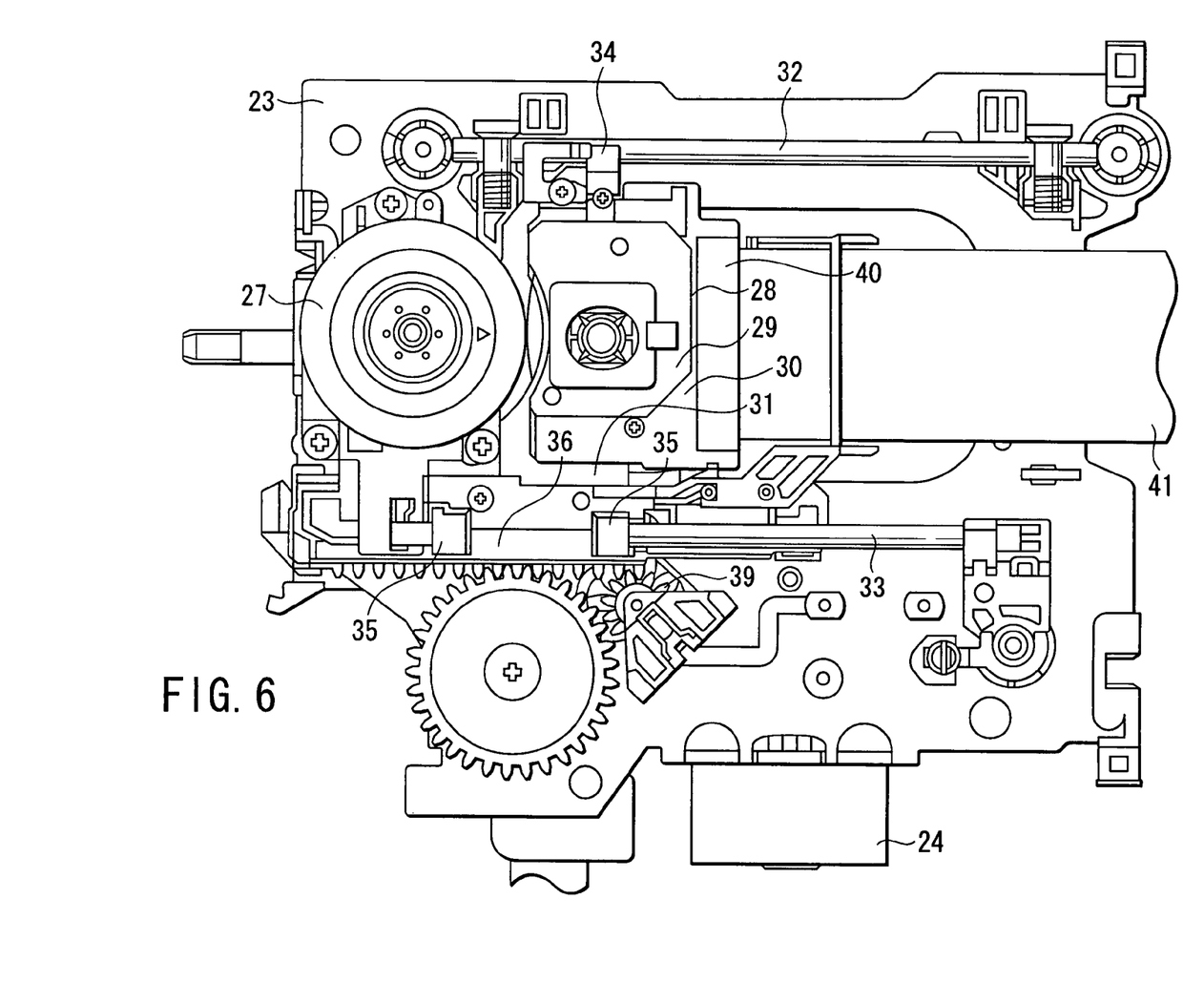
FIG. 6 is a view illustrating the state of a chassis in the disk loading unit, viewed from the top.
Figure 7:
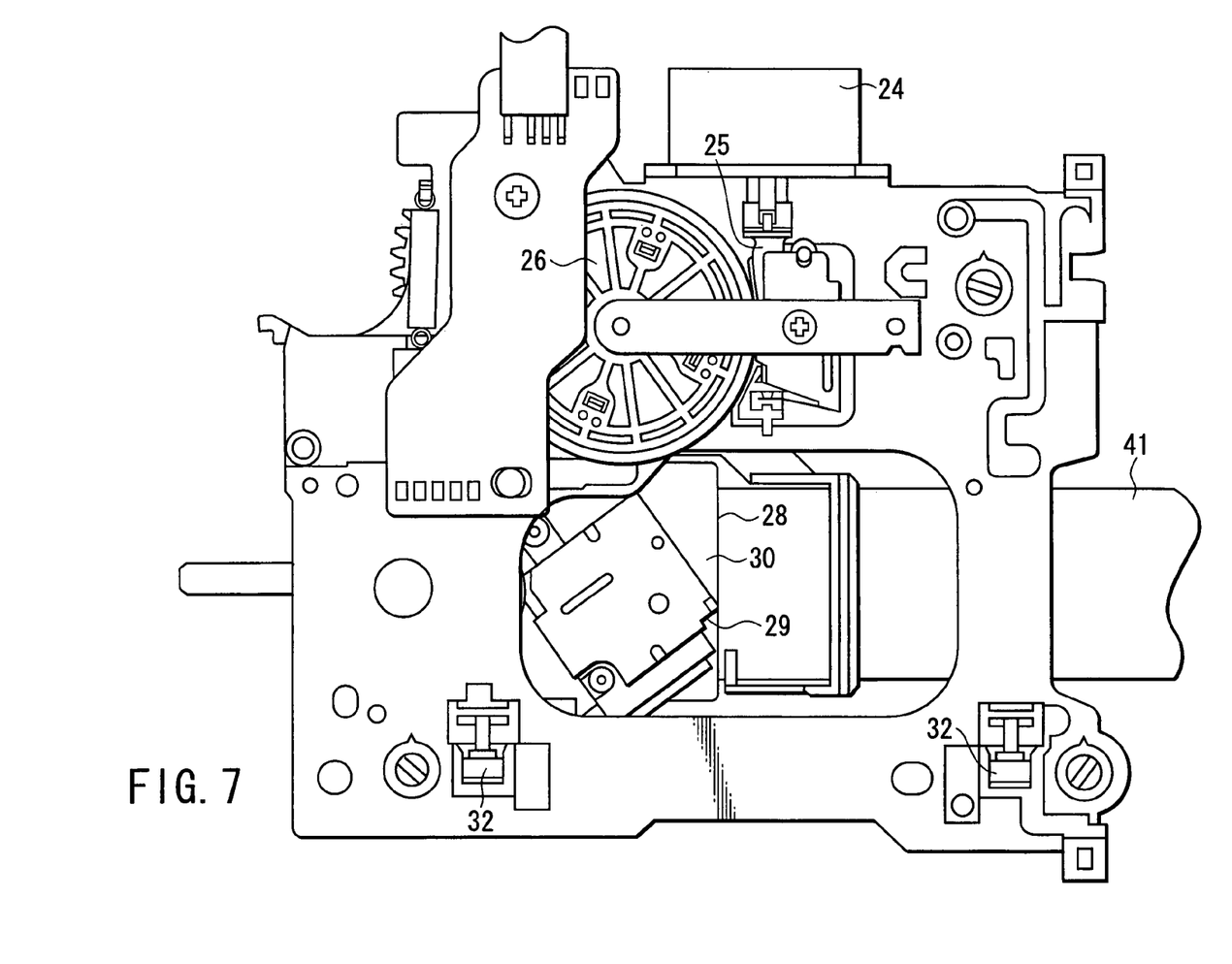
FIG. 7 is a view illustrating the state of the chassis in the disk loading unit, viewed from the bottom.
Figure 8:
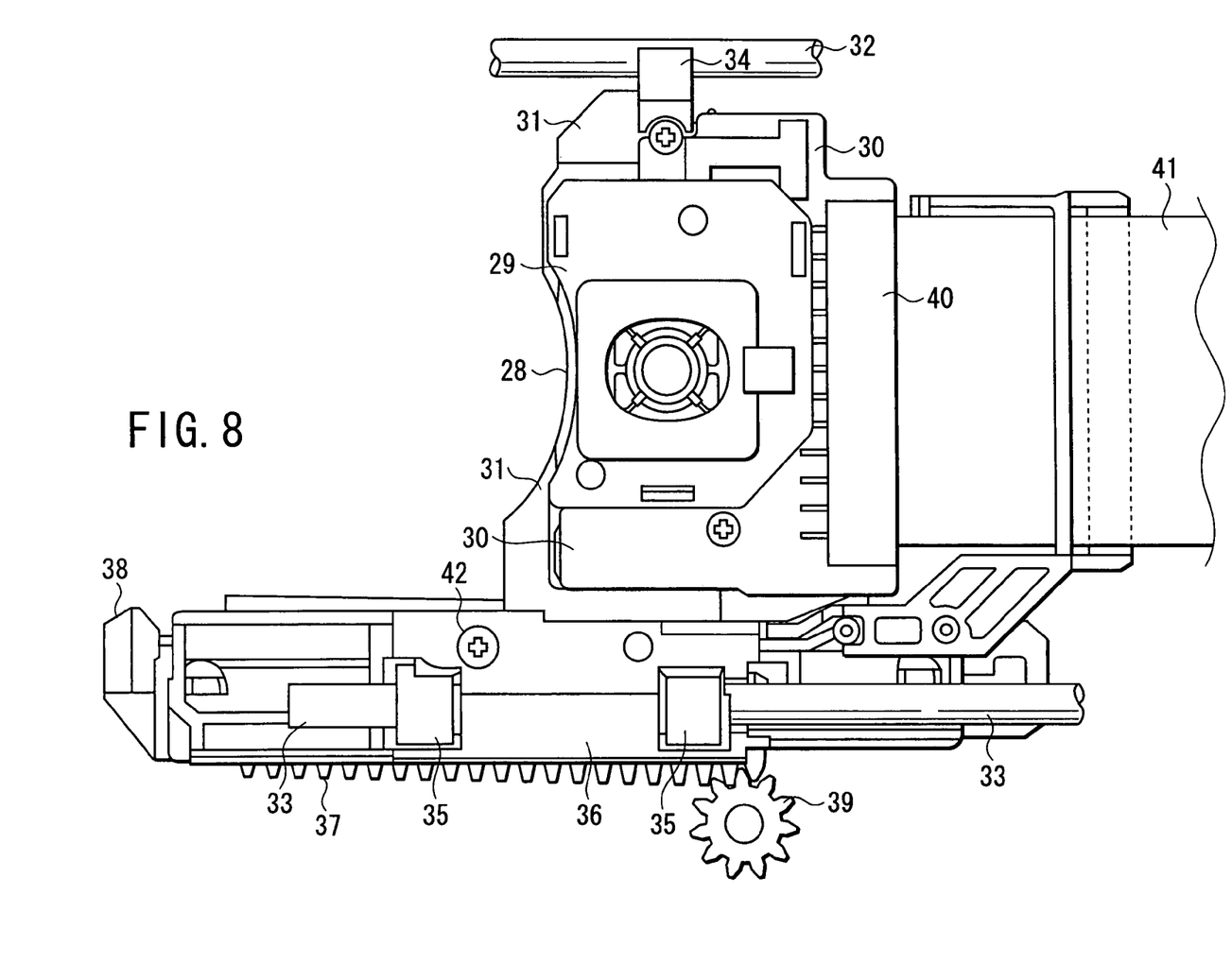
FIG. 8 is a view illustrating the detail of a feed mechanism in the disk loading unit.

FIG. 6 illustrates the state of the chassis 23, as viewed in the direction of FIG. 2. FIG. 7 illustrates the state of the chassis 23, as viewed from the bottom, that is, in the direction of FIG. 3. FIG. 8 illustrates a part of a feed mechanism for transferring the optical head from the state illustrated in FIG. 6.

In other words, the turn table 27 is fitted to the rotary shaft of a disk motor (not illustrated) fixed to the chassis 23, to be thus rotated and driven by the rotating force of the disk motor.

Furthermore, the above-described optical head 28 is fixed to the chassis 23. This optical head 28 is constituted of a head unit 29 provided with a laser diode and a photo diode which are not illustrated, a printed circuit board 30 to which the head unit 29 is fixed, and a holder 31 to which the printed circuit board 30 is fixed.

The optical head 28 is movably supported in a direction in which the optical head 28 approaches the turn table 27, and in a direction in which the optical head 28 is separated from the turn table 27, by a pair of guide shafts 32 and 33 secured in parallel to the chassis 23.

In this case, in the holder 31 are supported a holding member 34 slidably engageable with the guide shaft 32 and other holding members 35 slidably engageable with the guide shaft 33. Moreover, the optical head 28 is slidably supported by the guide shafts 32 and 33 via the holding members 34 and 35, respectively.

Here, as illustrated in FIG. 8, the holding member 34 engageable with the guide shaft 32 is constituted of a single member; in contrast, the two holding members 35 engageable with the guide shaft 33 are arranged at a predetermined interval along the axial direction of the guide shaft 33.

These two holding members 35, 35 are contained inside of a support member 36 fixed to the holder 31. With the support member 36, a rack unit 38 having a rack 37 formed outward movably engages via urging means, described later. A pinion gear 39 meshes with the rack 37.

The rotation of the pinion gear 39 enables the driving force in the axial direction of the guide shafts 32 and 33 to be transmitted to the rack 37, so that the optical head 28 is transferred under the guide of the guide shafts 32 and 33. The pinion gear 39 can be rotated and driven by the drive motor 24.

That is, as illustrated in FIG. 7, the worm gear 25 is fitted to the rotary shaft of the drive motor 24. The worm gear 25 meshes with the worm wheel 26 rotatably supported by the chassis 23, so that the rotating force of the drive motor 24 is transmitted to the worm wheel 26.

The pinion gear 39 is integrally formed coaxially with the worm wheel 26. Consequently, the pinion gear 39 is driven by the drive motor 24 via the worm wheel 26, and then, the optical head 28 is transferred. Incidentally, as the worm wheel 26 may be used, for example, a spur gear or a helical gear.

Here, FIG. 6 illustrates the state in which the optical head 28 is positioned at the innermost circumference of the optical disk, in other words, the state in which the optical head 28 approaches most the turn table 27. The optical head 28 is transferred from the position illustrated in FIG. 6 in a direction separated from the turn table 27 by the rotation in one direction of the drive motor 24. Additionally, the optical head 28 is transferred near the turn table 27 by the rotation of the drive motor 24 in the other direction.

Here, a connector 40 is disposed in the printed circuit board 30 having the head unit 29 fixed thereto. When a cable 41 is connected to the connector 40, a signal is received from or transmitted to the head unit 29.

Figure 9:
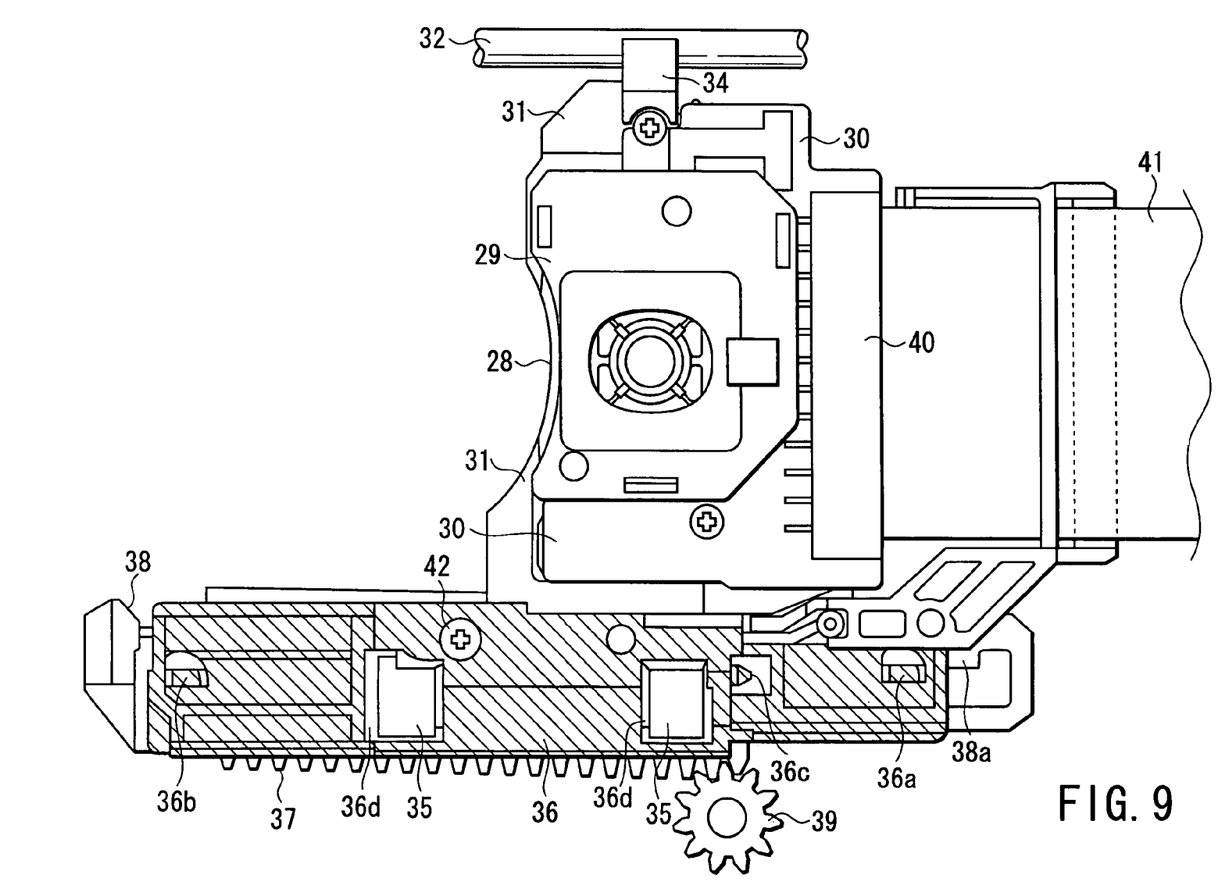
FIG. 9 is a view illustrating the detail of a support member in the feed mechanism.
Figure 10:
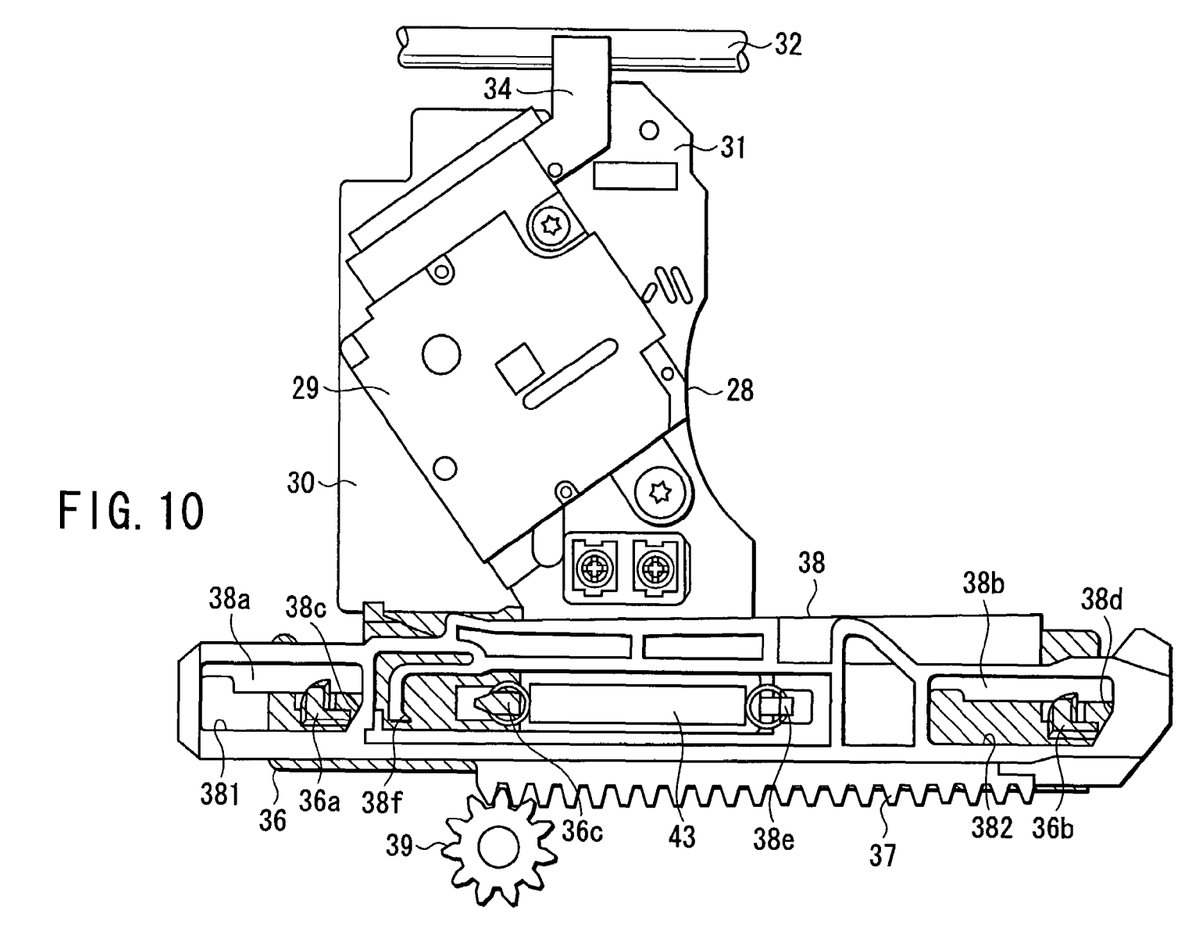
FIG. 10 is a view illustrating the state in which a rack unit is fixed to the support member in the feed mechanism.

In FIG. 9, the support member 36 illustrated in FIG. 8 is shown in detail by a slash line. Furthermore, FIG. 10 illustrates FIG. 9, as viewed from the bottom, in particular, in which the rack unit 38 is shown in detail. Incidentally, the guide shaft 33 is omitted in FIGS. 9 and 10 for the sake of simplification.

In FIG. 9, the support member 36 indicated by the slash line is made of a resin, and is provided at the center thereof with containers 36d and 36d in a substantially box shape, for containing therein the holding members 35 and 35, respectively. The support member 36 is formed into a substantially plate shape on both longitudinal sides of the containers 36d and 36d for the holding members 35 and 35, respectively, and then, is fixed to the holder 31 via a screw 42.

Moreover, bosses 36a and 36b are formed at both longitudinal ends of the support member 36, and further, a projection 36c for allowing a tension spring 43, described later, to be hooked thereon is formed near the containing positions of the holding members 35 and 35.

FIG. 10 illustrates the rack unit 38 incorporated in the support member 36, as viewed from the rack unit 38, in which the support member 36 is indicated by a slash line.

The rack unit 38 is made of a resin, and the rack 37 is integrally formed at one edge in the longitudinal direction of the rack unit 38. At both ends of the rack unit 38 are formed openings 381 and 382, at the edges of which engaging portions 38a and 38b engageable with the respective tips of the bosses 36a and 36b of the support member 36 are formed.

One end of each of the openings 381 and 382 is widely formed so as to allow the bosses 36a and 36b of the support member 36 to be inserted; in contrast, at the respective other ends of the openings 381 and 382 are formed tapered portions 38c and 38d.

Additionally, a hook 38e for allowing the tension spring 43 to be hooked between the projection 36c and itself is formed at the center of the rack unit 38 in the longitudinal direction. Moreover, a resilient piece 38f, which can be displaced in a thickness direction, is formed at the rack unit 38. The resilient piece 38f has the function of a stopper for preventing the rack unit 38 from being detached from the support member 36.

In order to incorporate the rack unit 38 into the support member 36 such configured as described above, first, the resilient piece 38f of the rack unit 38 is displaced in the thickness direction, and then, the bosses 36a and 36b of the support member 36 are inserted through wide portions of the openings 381 and 382, respectively, to engage at the tips thereof with the engaging portions 38a and 38b. Thus, the rack unit 38 can be movably supported by the support member 36 within the range of the openings 381 and 382.

When the wide portions of the openings 381 and 382 in the rack unit 38 move near the bosses 36a and 36b of the support member 36, the tip of the projection 36c of the support member 36 abuts against the resilient piece 38f of the rack unit 38, thereby restricting the movement. As a consequence, the bosses 36a and 36b can be inhibited from reaching the wide portions of the openings 381 and 382. In other words, the rack unit 38 cannot be detached from the support member 36 in a normal operating state.

When the coil-like tension spring 43 is hooked between the projection 36c of the support member 36 and the hook 38e of the rack unit 38 in the state in which the rack unit 38 engages with the support member 36, the rack unit 38 is urged by the resilient force in such a manner that the tapered portions 38c and 38d are press-fitted to the bosses 36a and 36b.

At this time, with the tapered portions 38c and 38d, the rack unit 38 receives force in such a manner as to be shifted in the direction of the rack 37, and therefore, the rack 37 is press-fitted to the pinion gear 39 by force according to the resilient force of the tension spring 43. Thus, it is possible to efficiently suppress a backlash between the rack 37 and the pinion gear 39.

Figure 11A:
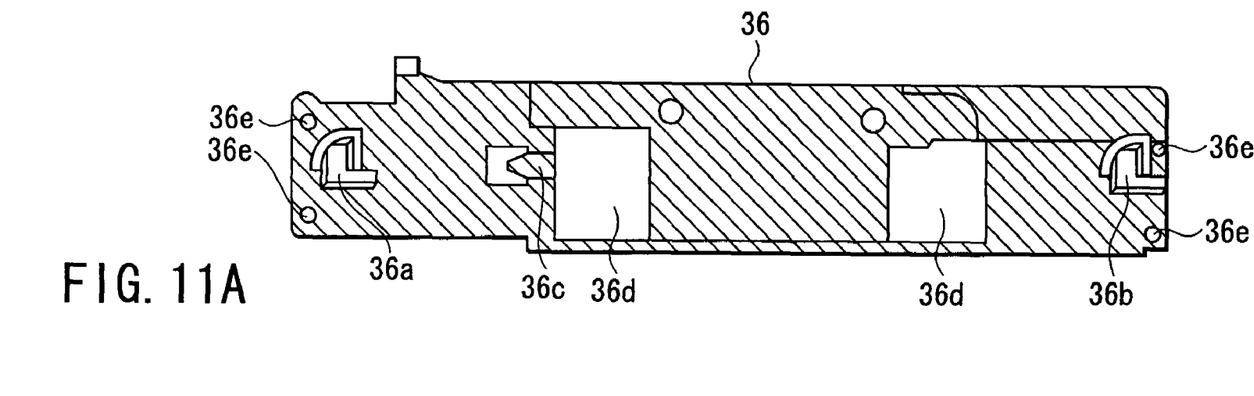
FIGS. 11A and 11B are views illustrating the detailed structure of the support member and the rack unit in the feed mechanism, respectively.
Figure 11B:
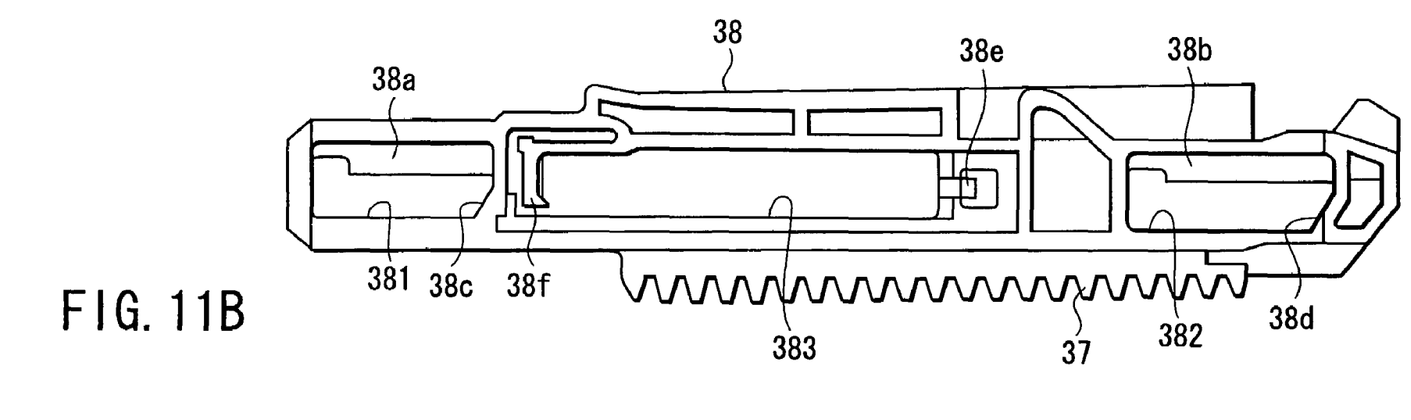

FIG. 11A illustrates the support member 36; and FIG. 11B illustrates the rack unit 38. In FIG. 11A, a surface facing to the rack unit 38 is indicated by a slash line, and further, the containers 36d and 36d, in which the holding members 35 and 35 are contained, respectively, are formed at the intermediate portion.

In the support member 36, there are formed a pair of projections 36e at each of both ends in the longitudinal direction, projecting from the surface facing to the rack unit 38 in a vertical direction. The support member 36 is configured in such a manner as to be brought into contact with the rack unit 38 via the projections 36e, such that the rack unit 38 can securely slide with ease.

In FIG. 11B, the rack unit 38 is integrally made of a resin, and further, an opening 383 is formed also at a portion at which the tension spring 43 is disposed at the center, in addition to the two openings 381 and 382 formed at both ends.

In the above-described embodiment, the support member 36 is secured to the holder 31 having the head unit 29 fixed thereto, and the rack unit 38 having the rack 37 formed thereat is fixed to the support member 36 via the urging means in such a manner that the rack 37 meshes with the pinion gear 39 at a predetermined pressure. As a consequence, it is possible to securely suppress the backlash generated between the pinion gear 39 and the rack 37 by the simple structure, so as to stably transfer the optical head 28.

Figure 12:
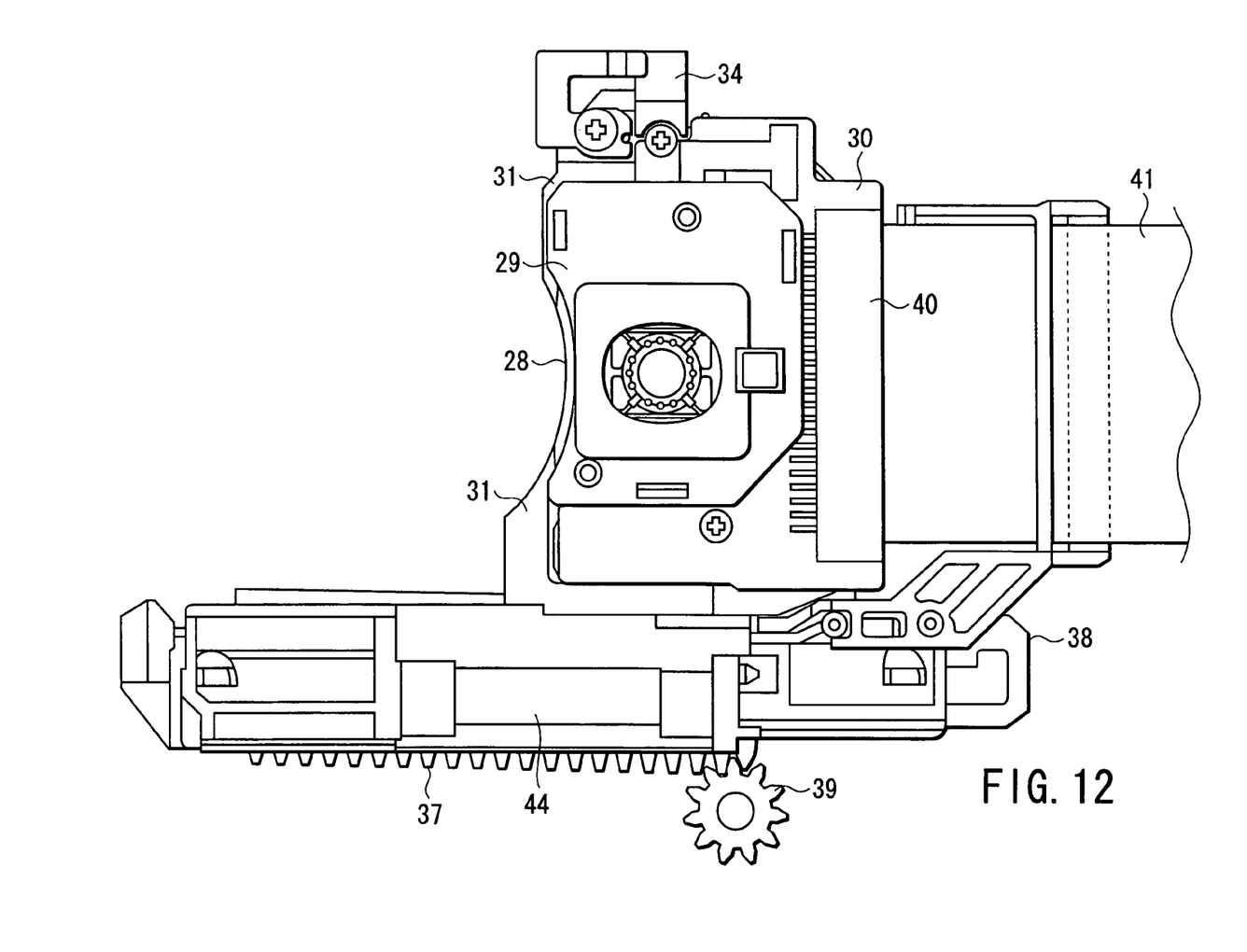
FIG. 12 is a view illustrating a modification of the feed mechanism.

Incidentally, although the support member 36 is secured to the holder 31 via the screw 42 in the above-described embodiment, it is possible to reduce the number of component parts and simplify the configuration if a support unit 44 having the same function as that of the support member 36 is formed integrally with the holder 31, as illustrated in FIG. 12.

Furthermore, although the bosses 36a and 36b are formed at the support member 36 and the tapered portions 38c and 38d are formed at the rack unit 38 in the above-described embodiment, tapered portions may be formed at the support member 36 while bosses may be formed at the rack unit 38.

It is to be understood that the present invention is not restricted to the embodiment, and that the constituent elements can be variously and specifically modified in embodiments without departing from the scope of the present invention. Moreover, the invention having various features can be devised by appropriately combining the plurality of constituent elements described in the above-described embodiment. For example, some constituent elements may be omitted from all of the constituent elements described in the embodiment. Additionally, constituent elements in another embodiment may be appropriately combined with each other.

What is claimed is:

1. An optical head apparatus comprising:
   a head unit configured to irradiate an optical disk with a light beam for recording or reproducing data;
   a holder configured to fix the head unit thereto;
   a support unit configured to movably support the holder in a radial direction of the optical disk;
   a support member configured to be fixed to the holder;
   a rack unit configured to movably engage with the support member within a predetermined range and to have a rack along a moving direction of the holder;
   a gear configured to mesh with the rack of the rack unit, so as to transmit rotating force of a drive source to the rack; and
   an urging unit configured to urge the rack unit against the support member in such a manner that the rack meshes with the gear by a predetermined resilient force.

2. An optical head apparatus according to claim 1, wherein the urging unit urges the rack unit against the support member in such a manner that the rack meshes with the gear by the predetermined resilient force by allowing a boss formed at any one of the support member and the rack unit with a tapered portion formed at the other member, so as to press-fit the boss and the tapered portion via a spring.

3. An optical head apparatus according to claim 2, wherein a plurality of engaging portions between the bosses and the tapered portions are disposed at the support member and the rack unit along the moving direction of the holder.

4. An optical head apparatus according to claim 2, wherein the spring is a coil-like tension spring hooked on the support member and the rack unit.

5. An optical head apparatus according to claim 1, wherein the support unit comprises:
   a guide shaft configured to be disposed along the radial direction of the optical disk; and
   a holding member fixed to the holder and configured to slidably engage with the guide shaft, and
   the support member comprises containers which contain the holding members therein, to be fixed to the holder.

6. An optical head apparatus according to claim 5, wherein the plurality of holding members are arranged on the holder along the longitudinal direction of the guide shaft.

7. An optical head apparatus according to claim 1, wherein the holder is formed integrally with the support member.

8. An optical head transferring method comprising:
   fixing a head unit which irradiates an optical disk with a light beam for recording or reproducing data, securing a support member to a holder movably supported in a radial direction of the optical disk, allowing a rack unit having a rack along a moving direction of the holder to movably engage with the support member within a predetermined range, and further, urging the rack unit against the support member in such a manner that the rack meshes with a gear by a predetermined resilient force; and
   rotating and driving the gear, so as to apply driving force to the rack, thus moving the head unit in the radial direction of the optical disk.

9. An optical disk apparatus comprising:
   a tray configured to allow an optical disk to be placed thereon;
   a loading unit configured to move the tray between a first position, at which the optical disk can be loaded or unloaded, and a second position, at which the optical disk is rotated to be driven;
   a head unit configured to irradiate the optical disk placed on the tray moved to the second position by the loading unit with a light beam for recording or reproducing data;
   a holder configured to fix the head unit thereto;
   a support unit configured to movably support the holder in a radial direction of the optical disk;
   a support member configured to be fixed to the holder;
   a rack unit configured to movably engage with the support member within a predetermined range and to have a rack along a moving direction of the holder;
   a gear configured to mesh with the rack of the rack unit, so as to transmit rotating force of a drive source to the rack; and
   an urging unit configured to urge the rack unit against the support member in such a manner that the rack meshes with the gear by a predetermined resilient force.

10. An optical disk apparatus according to claim 9, wherein the urging unit urges the rack unit against the support member in such a manner that the rack meshes with the gear by the predetermined resilient force by allowing a boss formed at any one of the support member and the rack unit with a tapered portion formed at the other member, so as to press-fit the boss and the tapered portion via a spring.

11. An optical disk apparatus according to claim 10, wherein a plurality of engaging portions between the bosses and the tapered portions are disposed at the support member and the rack unit along the moving direction of the holder.

12. An optical disk apparatus according to claim 10, wherein the spring is a coil-like tension spring hooked on the support member and the rack unit.

13. An optical disk apparatus according to claim 9, wherein the support unit comprises:
   a guide shaft configured to be disposed along the radial direction of the optical disk; and
   a holding member fixed to the holder and configured to slidably engage with the guide shaft, and
   the support member comprises containers which contain the holding members therein, to be fixed to the holder.

14. An optical disk apparatus according to claim 13, wherein the plurality of holding members are arranged on the holder along the longitudinal direction of the guide shaft.

15. An optical disk apparatus according to claim 9, wherein the holder is formed-integrally with the support member.

* * * * *